United States Patent
Steinich

(10) Patent No.: US 8,665,043 B2
(45) Date of Patent: Mar. 4, 2014

(54) ROTOR AND ASSEMBLY PROCEDURE THEREOF

(75) Inventor: Klaus Manfred Steinich, Zorneding/Poring (DE)

(73) Assignee: ASM Automation Sensorik Messtechnik GmbH, Moosinning (DE)

( * ) Notice: Subject to any disclaimer, the term of this patent is extended or adjusted under 35 U.S.C. 154(b) by 208 days.

(21) Appl. No.: 12/587,630

(22) Filed: Oct. 9, 2009

(65) Prior Publication Data

US 2010/0117774 A1    May 13, 2010

(30) Foreign Application Priority Data

Oct. 10, 2008  (DE) .......................... 10 2008 051 242

(51) Int. Cl.
    *H01F 7/00*  (2006.01)
    *H01F 1/00*  (2006.01)

(52) U.S. Cl.
    USPC ........................................... 335/219

(58) Field of Classification Search
    USPC .................. 335/216, 219, 296, 302
    See application file for complete search history.

(56) References Cited

U.S. PATENT DOCUMENTS

| 5,936,397 | A * | 8/1999 | Benkert et al. | 324/173 |
| 6,198,185 | B1 * | 3/2001 | Bruhn et al. | 310/68 B |
| 6,452,383 | B1 * | 9/2002 | Goedecke | 324/207.22 |
| 2004/0036631 | A1 * | 2/2004 | Kayao | 341/15 |
| 2004/0045154 | A1 * | 3/2004 | Kojima et al. | 29/598 |
| 2004/0129768 | A1 * | 7/2004 | Terazawa | 235/103 |
| 2005/0007226 | A1 * | 1/2005 | Mizuta | 335/207 |
| 2005/0200350 | A1 * | 9/2005 | Tomioka | 324/174 |

FOREIGN PATENT DOCUMENTS

| DE | 19546595 A1 | 6/1997 | G01P 3/487 |
| DE | 103 31 961 A1 | 7/2003 | H01F 7/02 |
| DE | 10335048 A1 | 7/2003 | G01P 3/44 |

* cited by examiner

*Primary Examiner* — Bernard Rojas

(74) *Attorney, Agent, or Firm* — Head, Johnson & Kachigian, P.C.

(57) ABSTRACT

For so-called pole wheels, as they are used for angle detection through magnetic field sensors, centering is facilitated and the service life of the pole wheel is increased by fixating the magnet ring rotationally and disengageable through sliding it on a prefabricated hub through a mounting device, which is disposed there between, like e.g. a friction locking band.

22 Claims, 3 Drawing Sheets

ROTOR AND ASSEMBLY PROCEDURE THEREOF

I. FIELD OF THE INVENTION

Figure 1A:
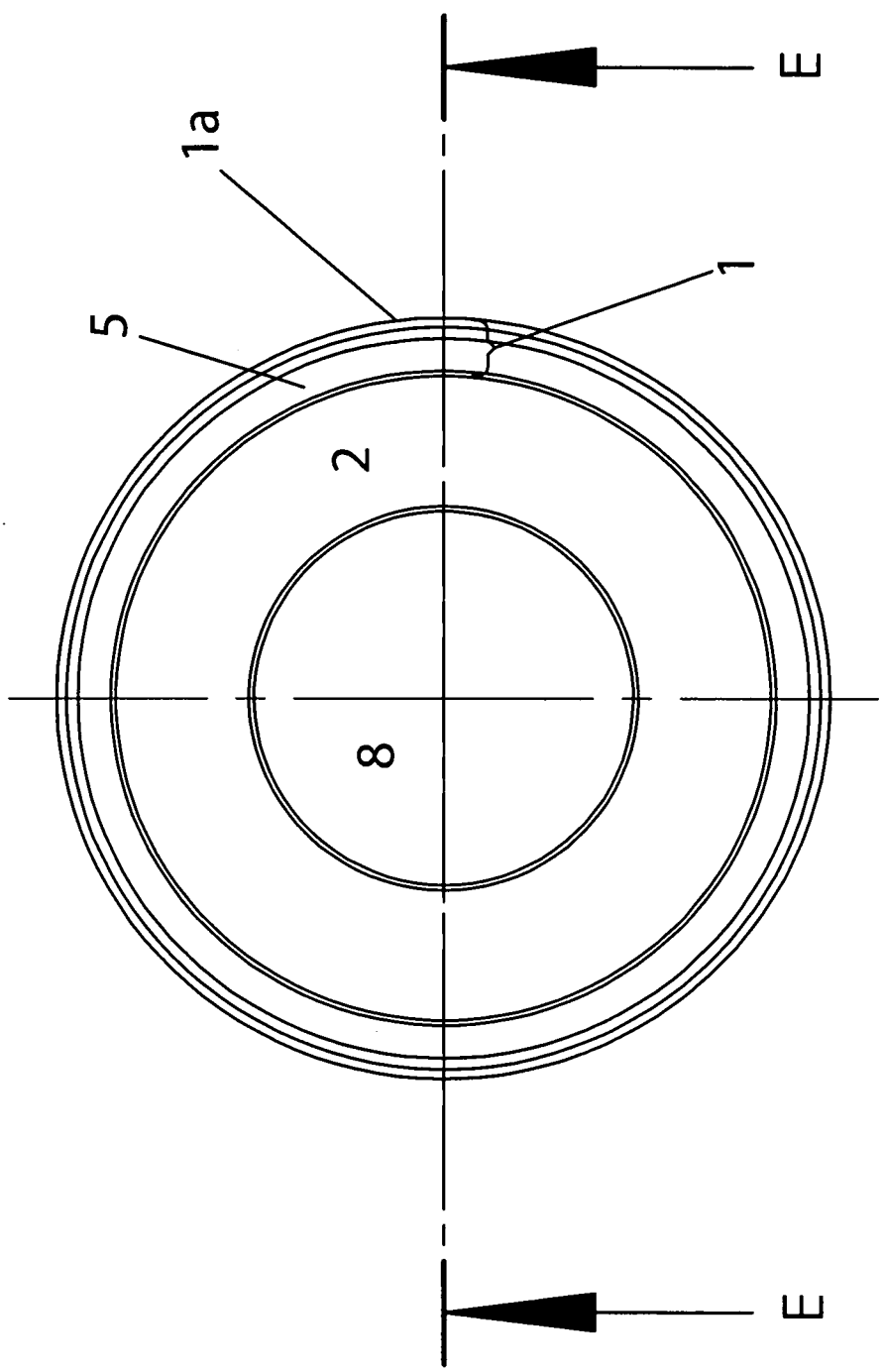

The invention relates to a pole wheel, thus a rotating body with alternating magnetization along the circumference, and it relates to the production of the pole wheel.

II. TECHNICAL BACKGROUND

For various applications, e.g. detecting a rotation position, rotating bodies are required, which can be mounted e.g. torque proof on a shaft stub, on whose outer circumference defined circumferential portions with alternating magnetization, thus north and south poles are applied.

Thus, for stability reasons, the core, namely the hub of the rotating body, typically has to be made of a metal material, in particular steel, while the magnetizations are caused in a magnet ring mounted thereon, which is made of a magnetizable material, e.g. ferrite or bonded neodymium iron boron.

Since such rotation body with its magnetized surface, mostly the circumferential surface, has to be moved along a magnetic field sensor with a small distance there between, which magnetic field sensor is mounted in a stationary position next to the rotating body, the rotating body also has to comply with high precision requirements with respect to roundness and axis alignment, in order to reliably prevent touching the magnet ring and the magnet field sensor.

Depending on the application, however, due to large temperature variations and the ensuing different expansion properties of the magnetic ring on one side and the hub material on the other side, high tensions can be generated there between, so that a fracture of the magnet ring and thus a destruction of the rotating body can occur.

Furthermore, when a magnet ring is glued onto the hub, the precision requirement for the rotating body often necessitates additional machining after the gluing process, in order to comply with the roundness requirements for the rotating body.

III. DESCRIPTION OF THE INVENTION a) Technical Object

Thus, it is the object of the invention to provide a rotating body with alternating magnetizations about its circumference, which can be manufactured in a simple and economic manner and which has a long service life irrespective of the operating conditions.

b) Solution

This object is accomplished by the features of claims 1 and 17. Advantageous embodiments can be derived from the dependent claims.

The object is accomplished through a method where the magnet ring is neither mounted directly on the hub nor glued thereon.

Instead, in particular the magnet ring, which is typically comprised of a very thin layer in radial direction with a thickness of only 1 mm to 3 mm is initially fixated rotationally and axially through surface contact on a stable support ring, made of magnetizable material, in particular steel.

Thus, gluing has not proven to be the preferred mounting method, but vulcanizing onto the support ring, wherein the magnet ring is made of a vulcanizeable filler material, in which magnetic particles, e.g. ferrite, are enclosed in a fine distribution.

The vulcanizing assures, on the one hand, a high form stability based on the form stable manufacture of the support ring. On the other hand, the vulcanizeable material of the magnet ring is sufficiently elastic, in order to absorb the expansion of the support ring due to temperature changes, which differs from the expansion relative of the magnet ring.

Vulcanizing the magnet ring directly onto the hub may have the advantage that mounting the support ring on the hub as an additional process step can be omitted; however, this creates a unit that cannot be changed, so that a new hub shape may have to be configured for each new application.

Since the slide-on ring, thus the support ring with the magnet ring mounted thereon, or also the magnet ring alone, can be received through a mounting device on each type of hub as long as only the receiving portion has the correct outer diameter, the hubs besides the receiver portion for the support ring can have a different configuration, thus they can be configured differently in the axial portions disposed further removed there from, e.g. they can have differently sized central bore holes for mounting on a shaft stub or similar.

In order to implement a sufficiently precise centering of the slide-on ring on the hub, when it is mounted on the hub and thus a centering of the magnet ring on the hub, the slide-on ring is fixated through providing a self-centering connection device, e.g. one or plural friction locking elements, in particular a friction locking band, between the outer diameter of the hub and the inner diameter of the support ring.

Thus, the band is made from spring elastic material, typically sheet metal, from whose plane preferably bulges are always embossed or punched out in the same direction, which bulges comprise a spring effect transversally to the plane of the band.

A circumferential groove is machined into the outer circumference of the hub, into which such a friction locking band is inserted, cut to the circumferential length of the groove bottom, and automatically remains in position on a smaller diameter.

The insertion is performed, so that the bulges are oriented in radial outward direction and since the thickness of the friction locking band including the bulge is greater than the radial height of the shoulder, the bulges, which mostly extend in line shape in the axial direction of the hub, and thus extend transversally to the longitudinal direction of the band, protrude slightly in radial direction beyond the shoulder of the circumferential groove.

Now pushing the stable, thus substantially radially nonexpendable, slide-on ring axially over the first shoulder and pushing the bulges of the friction locking band onto the second shoulder of the circumferential groove, the bulges of the friction locking band are pressed radially inward by the inner circumference of the slide-on ring and swaged, and thus over the entire circumference of the hub respectively with the same radially inward oriented force, which does not only fixate the slide-on ring with respect to rotation and in axial direction, but also fixates it, so that it self-centers on the hub.

This is supported by the radial outer circumference of the two shoulders of the circumferential groove being configured with very close tolerances relative to the dimension of the inner circumference of the slide-on ring, and it is prevented that the slide-on ring is fixated eccentric relative to the hub.

In order to avoid a tilting during the slide-on process, the outer circumferential edge of the first shoulder, which is disposed in opposite direction relative to the slide-on direction, is rounded or chamfered.

The second shoulder preferably comprises an axial stop, in order to prevent an excessive slide-on of the support ring.

The friction locking elements, in particular the friction locking bands, are cut to length from flat stock material, since producing them as an endless closed ring, on the one hand, is more complex; on the other hand, placing them in the circumferential groove past the lateral shoulder becomes difficult or impossible.

When producing them from a quasi endless piece of friction locking band, however, it is possible in a simple manner to wind this quasi endless friction locking band in a helix shape with an inner diameter, which is slightly smaller than the diameter of the base of the circumferential groove.

When a required piece of the friction locking band is then cut off from the helix according to the circumferential length of the circumferential groove, and this piece is inserted into the circumferential groove, thus it contacts the base of the circumferential groove with a preload and without auxiliary measures.

This way, e.g., the slide-on ring made from a support ring and magnet ring can be mounted onto each fitting outer diameter through the friction locking band, which can be configured by the customer as required, besides the mounting portion.

Magnetizing the magnet ring can be performed before or after sliding the support ring and the magnet ring onto the hub, preferably however, before sliding them onto the hub, and after mounting the magnet ring on the support ring.

c) Embodiments

Figure 1B:
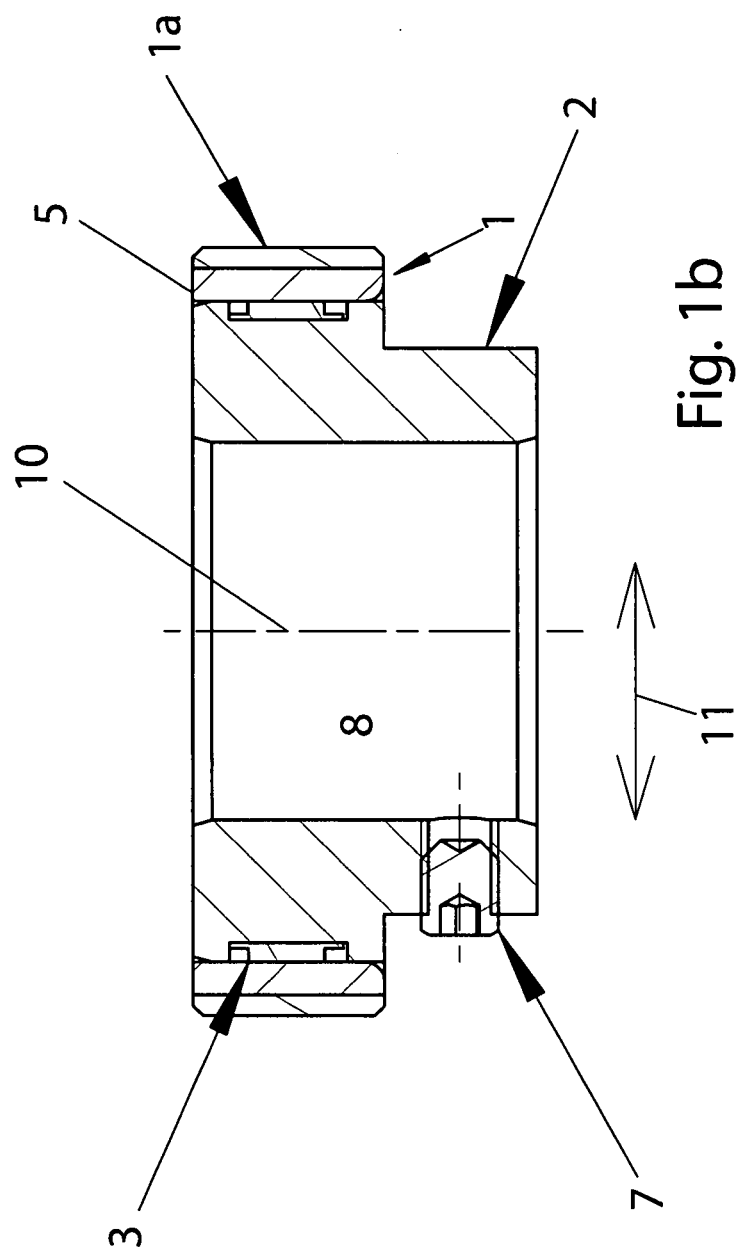
Figure 2:
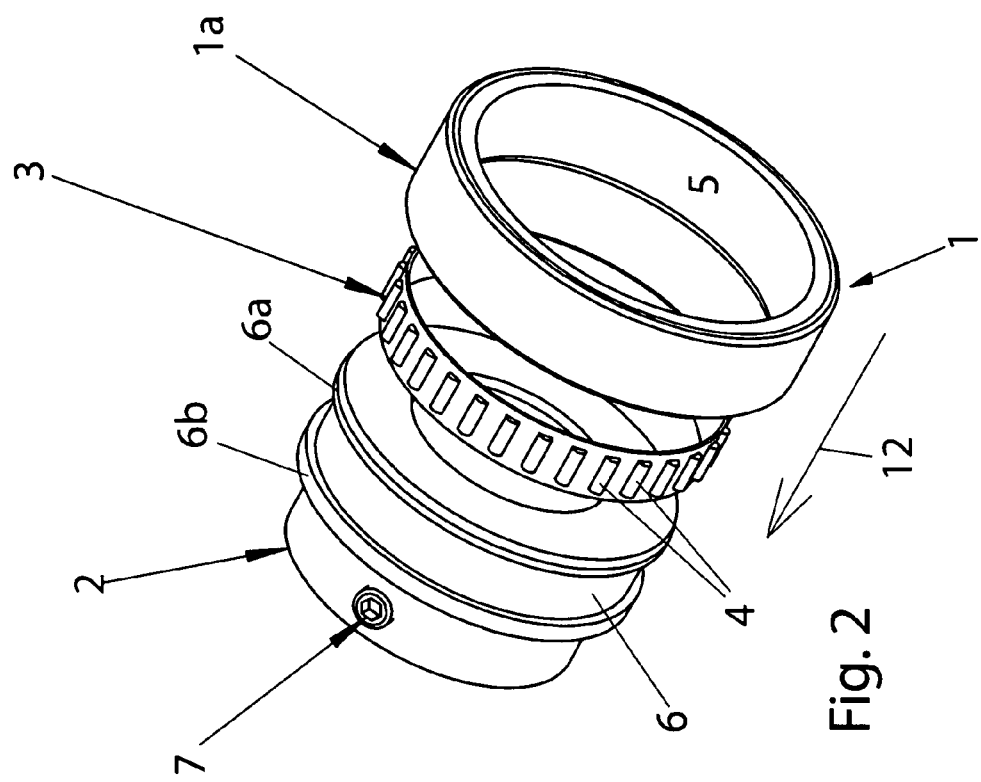
Figure 1C:
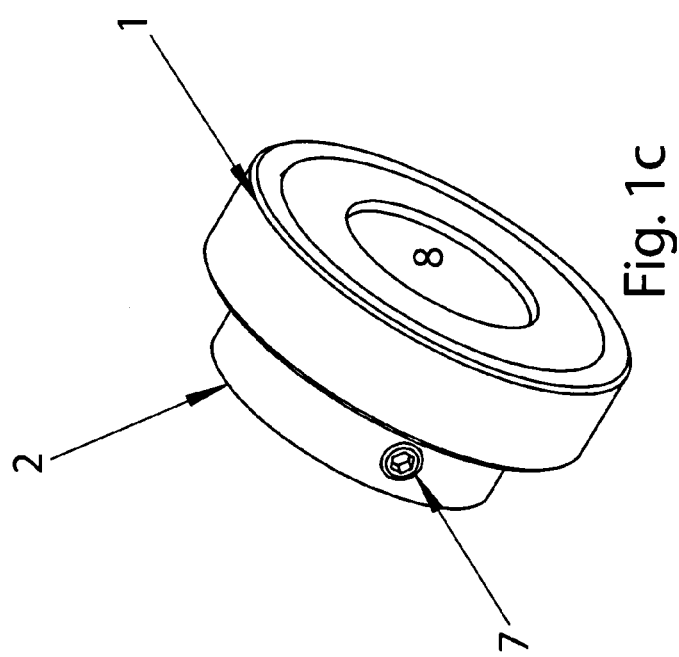

Embodiments according to the invention are subsequently described in more detail, wherein:

FIG. 1 shows the rotating body according to the invention in assembled state; and FIG. 2 shows the rotating body of FIG. 1 with its components before assembly.

As illustrated best in FIG. 1*b*, the rotating body is comprised of a hub 2 on which the magnet ring 1 is mounted indirectly.

The hub 2 comprises a central bore hole 8 extending in axial direction concentrically about the rotation axis 10, through which bore hole the rotating body is placed on a shaft, and can be clamped with a fixation bolt 7, which can be threaded radially through the hub 2.

In axial direction, the hub 2 comprises a stepped outer diameter, wherein the fixation bolt 7 is disposed in the portion of the smaller outer diameter, the magnet ring 1, however, is mounted on the greater outer diameter.

Thus, magnet ring 1 is not mounted directly on the hub 2, but it is initially mounted on the outer circumference of a stable support ring 5, which jointly form a slide-on ring 1+5.

The hub 2 has a circumferential groove 6 in the portion of the outer circumference, thus the larger outer diameter, in which portion, the slide on ring 1+5 shall be mounted, wherein the shoulders 6*a*, *b* of the circumferential groove comprise an outer circumference, which corresponds to the inner diameter of the support ring 5. A so-called friction locking band 3 is inserted into the circumferential groove 6, which friction locking band is made of spring elastic sheet metal, from whose plane bulges 4 are embossed respectively in the same direction.

The friction locking band 3 is inserted into the circumferential groove 6, so that the bulges 4 are oriented outward and the friction locking band 3 including its bulges 4, has a thickness which is slightly greater than the height of the shoulders 6*a*, *b*, the bulges 4 protrude radially outward slightly beyond the shoulders 6*a*, *b*.

The friction locking band 3 is made from a piece of flat band material, which forms a complete circumference in the circumference groove 6 when cut to length, wherein the ensuing circumferential gap is kept as small as possible.

After inserting the form locking band 3 into the circumferential groove 6, the slide-on ring 1+5 is slid in slide-on direction 12, thus in the axial direction 10, over the first shoulder 6*a*, the bulge 4 of the friction locking band 3, and the shoulder 6*b*, wherein the inner circumference of the support ring 5 presses the bulges 4 of the friction locking band 3 radially inward against the hub 2, thus with the same amount of force at each location of the circumference, so that the slide-on ring 1+5 is centered with respect to the hub 2 on the hub 2, axially fixated and also rotationally fixated, through the friction locking band 3.

The width, thus the axial extension of the slide-on ring 1+5, thus preferably corresponds to the axial distance between the outer ends of the shoulders 6*a* and 6*b*, wherein the first outer edge in slide-on direction 12 of the first shoulder 6*a* is chamfered or rounded in order to facilitate pressing the support ring 5 onto the hub 2 without catching an edge.

The magnet ring 1 in turn has previously been attached rotationally fixated or axially fixated on the support ring 5 preferably with a surface contact, for which in particular vulcanizing of the magnet ring 1 onto the support ring 5, which is mostly made of steel, has proven useful. For this purpose, magnetic particles are received in a vulcanized material, and the magnet ring 1 is formed there from, e.g. through casting, molding or drawing. The advantage is that in this manner, the magnet ring 1 can be produced by itself and can be mounted on the support ring, without subsequently requiring a finishing of the magnet ring or the support ring through machining.

By the same token, no further finishing is required after pressing the slide-on ring 1+5 onto the hub 2.

Since the friction locking band 3 is cut to length from a quasi endless piece of friction locking band, said quasi endless friction locking band is preferably initially wound up into a spiral, e.g. wound-up onto a core, so that said helix has an inner diameter, which is smaller than the diameter of the circumferential groove 6.

A piece of the friction locking band 3, which is cut off from said helix, thus has a radial preload, so that it automatically contacts the base of the groove until the slide-on ring 1+5 is slid on.

REFERENCE NUMERALS AND DESIGNATIONS 1 magnet ring
1*a* magnetizable layer
2 hub
3 friction locking band
4 bulge
5 support ring
6 circumferential groove
6*a, b* shoulder
7 fixation bolt
8 central bore hole
9 axial stop
10 axial direction, rotation axis
11 radial direction
12 slide-on direction
N, S magnetization

What is claimed is:

1. A rotor which comprises:
a rotating body with alternating magnetization along the circumference, in particular along the enveloping surface, wherein a magnet ring (1) provided with alternating magnetizations (N, S) is mounted on a hub (2) through a connection device rotationally fixed and axially aligned relative to the rotation axis (10) of the hub (2), wherein the magnet ring is fixed by said connection device provided between an outer diameter of the hub and an inner diameter of the magnet ring, wherein an inner diameter of the connection device faces the outer diameter of the hub, and an outer diameter of the connection device faces the inner diameter of the magnet ring wherein the connection device is a friction locking element with elements which are spring elastic with respect to its radial thickness, in particular an annular circumferential friction locking band (3) made from flat stock, in particular with radial embossings, cutouts or bulges (4) and wherein the friction locking band (3) is a sheet metal strip with a plurality of bulges (4), subsequent to one another and offset from each other in circumferential direction, or of one or plural bulges connected to one another in cross section in cross section direction, which bulges continuously extend in longitudinal direction of the friction locking band (3).

2. A rotor according to claim 1, wherein the magnet ring (1) is removably attached to the hub (2).

3. A rotor according to claim 1, wherein the friction locking band (3) is a hollow profile, in particular an enclosed circumferential hollow profile.

4. A rotor according to claim 1, wherein the magnet ring (1) comprises an inner support ring (5), on whose outer circumference a magnetized layer (1a) is applied, in particular glued on, which inner support ring is placed on the connection device.

5. A rotor according to claim 4, wherein the support ring (5) is made of magnetized material, in particular steel.

6. A rotor according to claim 1, wherein the hub (2) comprises a circumferential groove on its outer circumference (6), in which the friction locking band (3) is in friction locking contact or in particular also in form locking contact.

7. A rotor according to claim 6, wherein the circumferential groove (6) comprises at least one better two, axially opposed shoulders (6a, b), which have a tight tolerance at least in radial direction, and which serve as centering devices for the magnet ring (1) or the support ring (5).

8. A rotor according to claim 7, wherein the outer edge of the shoulder (6a), which is at the very from in slide-on direction of the slide-on ring (1+5), is rounded or chamfered.

9. A rotor according to claim 7, wherein the shoulder (6b), which is rearward in slide-on direction (12), comprises an axial stop (9) for the slide-on ring (1+5).

10. A rotor according to claim 7, wherein the thickness of the friction locking band (3) is greater in radial direction than the height of the shoulders (6a, b) of the circumferential groove (6).

11. A rotor according to claim 6, wherein the friction locking band (3) has a smaller inner diameter in unloaded state than the diameter of the circumferential groove (6) of the hub (2).

12. A rotor according to claim 1, wherein the magnet ring (1) includes magnet particles bound in a vulcanized material.

13. A rotor according to claim 1, wherein the slide-on ring (1+5) comprised of the magnet ring (1) or the support ring (5), and the magnet ring (1) is disposed on the friction locking band (3) with a preload, in particular on its bulges (4).

14. A method for producing a rotating body comprising:
a circumferentially alternating magnetization, wherein
a mounting device with self-centering properties, which is in particular annular in shape, is applied to a hub (2) along the circumference; and
a slide-on ring, which comprises a magnet ring (1), is removably mounted on the self-centering mounting device wherein the self-centering mounting device is a friction locking band (3), which is sized to the required length before applying to the hub (2), and inserted into a circumferential groove (6) on the outer circumference of the hub (2), in particular with the bulges (4) oriented outward.

15. A method according to claim 14, wherein the magnet ring (1) is applied to a support ring (5), in particular to its outer circumference, before applying the magnet ring to the mounting device, in particular the magnet ring is vulcanized to the support ring, wherein the magnet ring (1) includes magnet particles, which are bound in a vulcanized material.

16. A method according to claim 15, wherein the slide-on ring (1+5) is axially slid onto the hub (2), which is configured with a friction locking band (3), in order to apply the slide-on ring (1+5).

17. A method according to claim 14, wherein the friction locking band (3) is quasi wound-up into an endless spiral before being sized to length, wherein the inner diameter of the spiral is smaller than the diameter of the circumferential groove (6).

18. A method according to claim 14, wherein the magnet ring (1) is provided with magnetizations (N, S) alternating in circumferential direction, after the magnet ring (1) is applied to the hub (2).

19. A rotating body with alternating magnetization along the circumference, in particular along the enveloping surface, wherein
a magnet ring (1) provided with alternating magnetizations (N, S) is mounted on a hub (2) through a connection device rotationally fixed and axially aligned relative to the rotation axis (10) of the hub (2),
the magnet ring (1) is removably attached to the hub (2), and
the connection device is annular and cut to circumferential length and is a sheet metal strip with a plurality of bulges (4), subsequent to one another and offset from each other in circumferential direction.

20. A method for producing a rotating body comprising:
a circumferentially alternating magnetization, wherein
a mounting device with self-centering properties, which is in particular annular in shape, is applied to a hub (2) along the circumference;
a slide-on ring, which comprises a magnet ring (1), removably mounted on the self-centering mounting device, and
the self-centering mounting device is a friction locking band (3), sized to the required length before applying to the hub (2), and inserted into a circumferential groove (6) on the outer circumference of the hub (2).

21. A rotor which comprises:
a rotating body with alternating magnetization along the circumference, in particular along the enveloping surface, wherein a magnet ring (1) provided with alternating magnetizations (N, S) is mounted on a hub (2) through a connection device rotationally fixed and axially aligned relative to the rotation axis (10) of the hub (2) wherein the connection device is a friction locking element with elements which are spring elastic with respect to its radial thickness, in particular an annular circumferential friction locking band (3) made from flat stock, in particular with radial embossings, cutouts or bulges (4) and wherein the hub (2) comprises a circumferential groove on its outer circumference (6), in which the friction locking band (3) is in friction locking contact or in particular also in form locking contact.

22. A rotor which comprises:

a rotating body with alternating magnetization along the circumference, in particular along the enveloping surface, wherein a magnet ring (1) provided with alternating magnetizations (N, S) is mounted on a hub (2) through a connection device rotationally fixed and axially aligned relative to the rotation axis (10) of the hub (2), wherein the magnet ring is fixed by said connection device provided between an outer diameter of the hub and an inner diameter of the magnet ring, wherein an inner diameter of the connection device faces the outer diameter of the hub, and an outer diameter of the connection device faces the inner diameter of the magnet ring wherein the connection device is a friction locking element with elements which are spring elastic with respect to its radial thickness, in particular an annular circumferential friction locking band (3) made from flat stock, in particular with radial embossings, cutouts or bulges (4); and wherein the slide-on ring (1+5) comprised of the magnet ring (1) or the support ring (5), and the magnet ring (1) is disposed on the friction locking band (3) with a preload, in particular on its bulges (4).

\* \* \* \* \*